(12) United States Patent
Coppola et al.

(10) Patent No.: US 11,554,975 B2
(45) Date of Patent: Jan. 17, 2023

(54) FUSION DRAW APPARATUS AND METHODS OF MAKING A GLASS RIBBON

(71) Applicant: Corning Incorporated, Corning, NY (US)

(72) Inventors: Frank Coppola, Horseheads, NY (US); Robert Delia, Horseheads, NY (US); Vladislav Yuryevich Golyatin, Avon (FR); Shawn Rachelle Markham, Harrodsburg, KY (US); Jon Anthony Passmore, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 239 days.

(21) Appl. No.: 16/607,232

(22) PCT Filed: Apr. 16, 2018

(86) PCT No.: PCT/US2018/027762
§ 371 (c)(1),
(2) Date: Oct. 22, 2019

(87) PCT Pub. No.: WO2018/200237
PCT Pub. Date: Nov. 1, 2018

(65) Prior Publication Data
US 2020/0299173 A1 Sep. 24, 2020

Related U.S. Application Data

(60) Provisional application No. 62/488,921, filed on Apr. 24, 2017.

(51) Int. Cl.
*C03B 17/06* (2006.01)

(52) U.S. Cl.
CPC .......... *C03B 17/067* (2013.01); *C03B 17/064* (2013.01)

(58) Field of Classification Search
None
See application file for complete search history.

(56) References Cited

U.S. PATENT DOCUMENTS

| | | | |
|---|---|---|---|
| 7,409,839 B2 * | 8/2008 | Boratav | C03B 17/064 65/193 |
| 8,176,753 B2 | 5/2012 | Kahlout et al. | |

(Continued)

FOREIGN PATENT DOCUMENTS

| | | |
|---|---|---|
| CN | 101318765 A | 12/2008 |
| CN | 101326130 A | 12/2008 |

(Continued)

OTHER PUBLICATIONS

International Search Report and Written Opinion of the International Searching Authority; PCT/US2018/027762; dated Jul. 12, 2018; 12 Pages; European Patent Office.

(Continued)

*Primary Examiner* — Jodi C Franklin
(74) *Attorney, Agent, or Firm* — Matthew J. Mason

(57) ABSTRACT

An apparatus for making a glass ribbon can include a heating plane including a heat footprint facing the surface of an edge director. A projection of the heat footprint in a resultant direction of the heating plane within the heat footprint can intersect the surface of the edge director. In further embodiments, a fusion draw method of making a glass ribbon can include radiating heat within a heat footprint of a heating plane toward a surface of an edge director. At least a portion of the heating plane within the heat footprint can face the surface of the edge director so that the surface of the edge director is intersected with heat radiating from the heat footprint of the heating plane.

11 Claims, 7 Drawing Sheets

(56) References Cited

U.S. PATENT DOCUMENTS

| | | |
|---|---|---|
| 9,512,025 B2 | 12/2016 | Chung et al. |
| 2007/0130994 A1 | 6/2007 | Boratav et al. |
| 2011/0010057 A1 | 1/2011 | Kim |
| 2011/0209502 A1* | 9/2011 | El Kahlout ............ C03B 17/068 65/184 |
| 2011/0277504 A1* | 11/2011 | Pitbladdo .............. C03B 17/067 65/53 |
| 2013/0133370 A1* | 5/2013 | Boratav ................ C03B 17/064 65/84 |
| 2013/0319049 A1 | 12/2013 | Grzesik et al. |
| 2014/0238077 A1* | 8/2014 | Anderson ............. C03B 17/067 65/355 |
| 2015/0329401 A1* | 11/2015 | Chung .................. C03B 17/067 65/195 |
| 2016/0046518 A1 | 2/2016 | Geathers et al. |
| 2017/0057874 A1 | 3/2017 | Miao et al. |
| 2018/0244566 A1* | 8/2018 | Hamilton .............. C03B 33/033 |

FOREIGN PATENT DOCUMENTS

| | | |
|---|---|---|
| CN | 102190425 A | 9/2011 |
| CN | 102762507 A | 10/2012 |
| CN | 102765869 A | 11/2012 |
| CN | 103011562 A | 4/2013 |
| CN | 103608307 A | 2/2014 |
| CN | 204550379 U | 8/2015 |
| CN | 105050969 A | 11/2015 |
| CN | 105645738 A | 6/2016 |
| CN | 105764862 A | 7/2016 |
| CN | 106132905 A | 11/2016 |
| CN | 106536429 A | 3/2017 |
| JP | 2011-178657 A | 9/2011 |
| JP | 5642832 B2 | 12/2014 |
| TW | 201038496 A | 11/2010 |
| TW | 201540690 A | 11/2015 |
| TW | 201612119 A | 4/2016 |
| TW | 201613830 A | 4/2016 |
| TW | 201627233 A | 8/2016 |
| WO | 2011090893 A1 | 7/2011 |
| WO | 2014099560 A1 | 6/2014 |
| WO | 2015080879 A1 | 6/2015 |
| WO | 2015/148631 A1 | 10/2015 |
| WO | 2015/175607 A1 | 11/2015 |
| WO | 2017087183 A2 | 5/2017 |
| WO | 2018081772 A1 | 5/2018 |

OTHER PUBLICATIONS

Chinese Patent Application No. 201880027279.9, Office Action dated Sep. 3, 2021, 5 pages (English Translation Only), Chinese Patent Office.

Taiwanese Patent Application No. 107113683, Office Action dated Aug. 16, 2021, 4 pages (English Translation Only); Taiwanese Patent Office.

* cited by examiner

FUSION DRAW APPARATUS AND METHODS OF MAKING A GLASS RIBBON

This application claims the benefit of priority under 35 U.S.C. § 371 of International Application Serial No. PCT/US2018/027762, filed on Apr. 16, 2018, which, in turn, claims the benefit of priority to U.S. Provisional Application Ser. No. 62/488,921 filed on Apr. 24, 2017, the content of each are relied upon and incorporated herein by reference in their entirety.

FIELD

The present disclosure relates generally to fusion draw apparatus and methods and, more particularly, fusion draw apparatus including a heating plane for heating an edge director and methods of making a glass ribbon including heating an edge director.

BACKGROUND

It is known to fusion draw molten material off a root of a forming wedge into a glass ribbon. It is also known to provide the forming wedge with edge directors to minimize attenuation of the width of the glass ribbon. However, excess cooling of the molten material contacting the surface of the edge directors may undesirably result in devitrification of the molten material into glass deposits on the surfaces of the edge directors. If allowed to form, such glass deposits may periodically break off and form imperfections in the glass ribbon. Furthermore, such glass deposits may reduce the wettability of the surfaces of the edge directors in contact with the molten material, thereby causing the molten material to prematurely pull away from the edge directors. Premature pulling away of the molten material from the edge directors can reduce fusion quality of the outer edge of the glass ribbon and result in undesired variation the width of the glass ribbon.

SUMMARY

In order to address the above and other concerns, some embodiments of the disclosure can target radiative heat to be directly applied to the surface of the edge directors in contact with the molten material. Such targeting of radiative heat can reduce or prevent devitrification of the molten material into glass crystals on the heated surfaces of the edge directors. Furthermore, targeting the radiative heat to the surface of the edge directors in contact with the molten material can reduce undesired attenuation of the width of the glass ribbon by reducing application of unnecessary heat to other portions of the molten material and/or edges of the glass ribbon being drawn from the root of the wedge.

The following presents a simplified summary of the disclosure to provide a basic understanding of some embodiments described in the detailed description. Some embodiments are described below with the understanding that any of the embodiments may be used alone or in combination with one another.

Embodiment 1

A fusion draw method of making a glass ribbon can include flowing molten material over a pair of downwardly inclined surface portions of a wedge. The downwardly inclined surface portions can converge along a downstream direction to form a root of the wedge. The method can further include flowing the molten material over a surface of an edge director. The edge director can intersect with at least one of the pair of downwardly inclined surface portions. The method can further include drawing the molten material from the root of the wedge along a draw plane in the downstream direction to form the glass ribbon. The method can further include radiating heat within a heat footprint of a heating plane toward the surface of the edge director. At least a portion of the heating plane within the heat footprint can face the surface of the edge director so that the surface of the edge director can be intersected with the heat radiating from the heat footprint of the heating plane.

Embodiment 2

The method of embodiment 1, wherein a projection of the heat footprint in a resultant direction of the heating plane within the heat footprint can intersect the surface of the edge director at least partially below the root.

Embodiment 3

The method of embodiment 2, wherein greater than 50% of the intersected surface of the edge director can be below the root.

Embodiment 4

The method of embodiment 3, wherein 100% of the intersected surface of the edge director can be below the root.

Embodiment 5

The method of any one of embodiments 1-4, wherein the heating plane can include a flat surface.

Embodiment 6

The method of any one of embodiments 1-4, wherein the heating plane can include a convex surface.

Embodiment 7

The method of any one of embodiments 1-4, wherein the heating plane can include a concave surface.

Embodiment 8

The method of any one of embodiments 1-7, wherein the heating plane can be moved in an adjustment direction towards the surface of the edge director.

Embodiment 9

The method of embodiment 8, wherein the adjustment direction can be perpendicular to the draw plane.

Embodiment 10

The method of any one of embodiments 1-9, wherein an insulation shield can be positioned below a lower perimeter of the heat footprint to inhibit heat loss below the lower perimeter of the heat footprint.

Embodiment 11

The method of embodiment 10, wherein the insulation shield can be moved toward the draw plane.

Embodiment 12

The method of any one of embodiments 10-11, wherein the insulation shield can be moved in a direction perpendicular to the draw plane.

Embodiment 13

An apparatus can include a wedge including a pair of inclined surface portions converging along a downstream direction to form a root of the wedge. The apparatus can further include an edge director intersecting with at least one of the pair of downwardly inclined surface portions. The apparatus can still further include a heating plane including a heat footprint facing a surface of the edge director. A projection of the heat footprint in a resultant direction of the heating plane within the heat footprint can intersect the surface of the edge director.

Embodiment 14

The apparatus of embodiment 13, wherein the projection of the heat footprint in the resultant direction can intersect the surface of the edge director at least partially below the root.

Embodiment 15

The apparatus of embodiment 14, wherein greater than 50% of the intersected surface of the edge director can be below the root.

Embodiment 16

The apparatus of embodiment 15, wherein 100% of the intersected surface of the edge director can be below the root.

Embodiment 17

The apparatus of any one of embodiments 13-16, wherein the heating plane can include a flat surface.

Embodiment 18

The apparatus of any one of embodiments 13-16, wherein the heating plane can include a convex surface.

Embodiment 19

The apparatus of any one of embodiments 13-16, wherein the heating plane can include a concave surface.

Embodiment 20

The apparatus of any one of embodiments 13-19, wherein the heating plane can be movable in an adjustment direction towards the surface of the edge director.

Embodiment 21

The apparatus of embodiment 20, wherein the adjustment direction can be perpendicular to a draw plane of the wedge.

Embodiment 22

The apparatus of any one of embodiments 13-21, wherein an insulation shield can be positioned below a lower perimeter of the heat footprint.

Embodiment 23

The apparatus of embodiment 22, wherein the insulation shield can be movable toward the draw plane.

Embodiment 24

The apparatus of any one of embodiments 22-23, wherein the insulation shield can be movable in a direction perpendicular to the draw plane.

BRIEF DESCRIPTION OF THE DRAWINGS

These and other features, embodiments and advantages are better understood when the following detailed description is read with reference to the accompanying drawings, in which.

DETAILED DESCRIPTION

Figure 1:
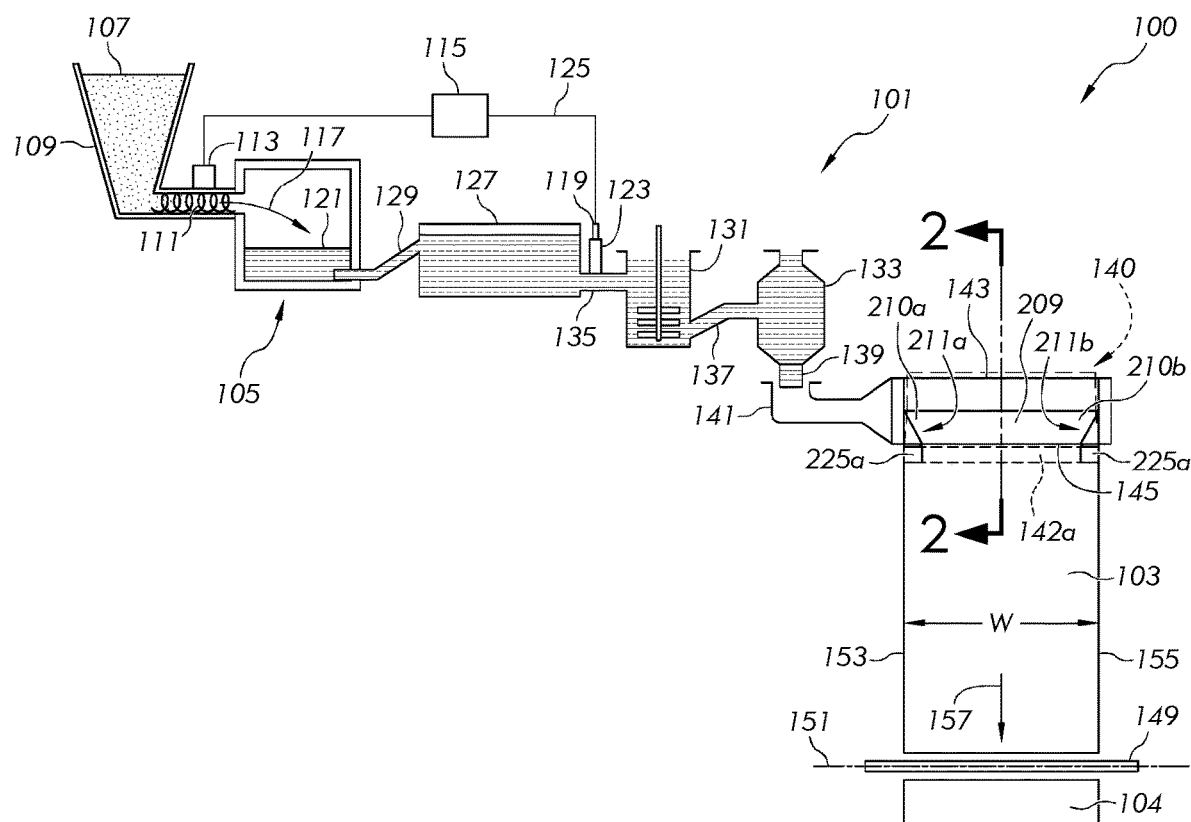
FIG. 1 schematically illustrates an apparatus for processing molten material including a fusion down-draw apparatus.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

It is to be understood that specific embodiments disclosed herein are intended to be exemplary and therefore non-limiting. The present disclosure relates to apparatus and methods of forming a glass ribbon. Glass sheets may be subsequently separated from the glass ribbon and may be used in a wide variety of applications. For instance, glass sheets subsequently separated from the formed glass ribbon can be suitable for further processing into a desired display application. The glass sheets can be used in a wide range of display applications, including liquid crystal displays (LCDs), electrophoretic displays (EPD), organic light emitting diode displays (OLEDs), plasma display panels (PDPs), or the like.

FIG. 1 schematically illustrates an apparatus 100 for processing molten material comprising a fusion down-draw apparatus 101 for fusion drawing a glass ribbon 103 for subsequent processing into glass sheets 104. The fusion down-draw apparatus 101 can include a melting vessel 105 that receives batch material 107 from a storage bin 109. The batch material 107 can be introduced by a batch delivery device 111 powered by a motor 113. An optional controller 115 can be used to activate the motor 113 to introduce a desired amount of batch material 107 into the melting vessel 105, as indicated by arrow 117. A molten material probe 119 can be used to measure a molten material 121 level within a standpipe 123 and communicate the measured information to the controller 115 by way of a communication line 125.

The fusion down-draw apparatus 101 can also include a first conditioning station such as a fining vessel 127 located downstream from the melting vessel 105 and coupled to the melting vessel 105 by way of a first connecting conduit 129. In some embodiments, glass melt may be gravity fed from the melting vessel 105 to the fining vessel 127 by way of the first connecting conduit 129. For instance, gravity may act to drive the glass melt to pass through an interior pathway of the first connecting conduit 129 from the melting vessel 105 to the fining vessel 127. Within the fining vessel 127, bubbles may be removed from the glass melt by various techniques.

The fusion draw apparatus can further include a second conditioning station such as a glass melt mixing vessel 131 that may be located downstream from the fining vessel 127. The glass melt mixing vessel 131 can be used to provide a homogenous glass melt composition, thereby reducing or eliminating cords of inhomogeneity that may otherwise exist within the fined glass melt exiting the fining vessel. As shown, the fining vessel 127 may be coupled to the glass melt mixing vessel 131 by way of a second connecting conduit 135. In some embodiments, glass melt may be gravity fed from the fining vessel 127 to the glass melt mixing vessel 131 by way of the second connecting conduit 135. For instance, gravity may act to drive the glass melt to pass through an interior pathway of the second connecting conduit 135 from the fining vessel 127 to the glass melt mixing vessel 131.

The fusion draw apparatus can further include another conditioning station such as a delivery vessel 133 that may be located downstream from the glass melt mixing vessel 131. The delivery vessel 133 may condition the glass to be fed into a forming device. For instance, the delivery vessel 133 can act as an accumulator and/or flow controller to adjust and provide a consistent flow of glass melt to the forming vessel. As shown, the glass melt mixing vessel 131 may be coupled to the delivery vessel 133 by way of a third connecting conduit 137. In some embodiments, glass melt may be gravity fed from the glass melt mixing vessel 131 to the delivery vessel 133 by way of the third connecting conduit 137. For instance, gravity may act to drive the glass melt to pass through an interior pathway of the third connecting conduit 137 from the glass melt mixing vessel 131 to the delivery vessel 133.

As further illustrated, a downcomer 139 can be positioned to deliver molten material 121 from the delivery vessel 133 to an inlet 141 of a forming vessel 143. The glass ribbon 103 may then be fusion drawn off the root 145 of a forming wedge 209 and subsequently separated into the glass sheets 104 by a glass separation apparatus 149. As illustrated, the glass separation apparatus 149 may divide the glass sheet 104 from the glass ribbon 103 along a separation path 151 that extends along a width "W" of the glass ribbon 103 between a first outer edge 153 and a second outer edge 155 of the glass ribbon 103. As illustrated in FIG. 1, in some embodiments, the separation path 151 may extend substantially perpendicular to a draw direction 157 of the glass ribbon 103. In the illustrated embodiment, the draw direction 157 can be the fusion draw direction of the glass ribbon 103 being fusion down-drawn from the forming vessel 143.

Figure 2:
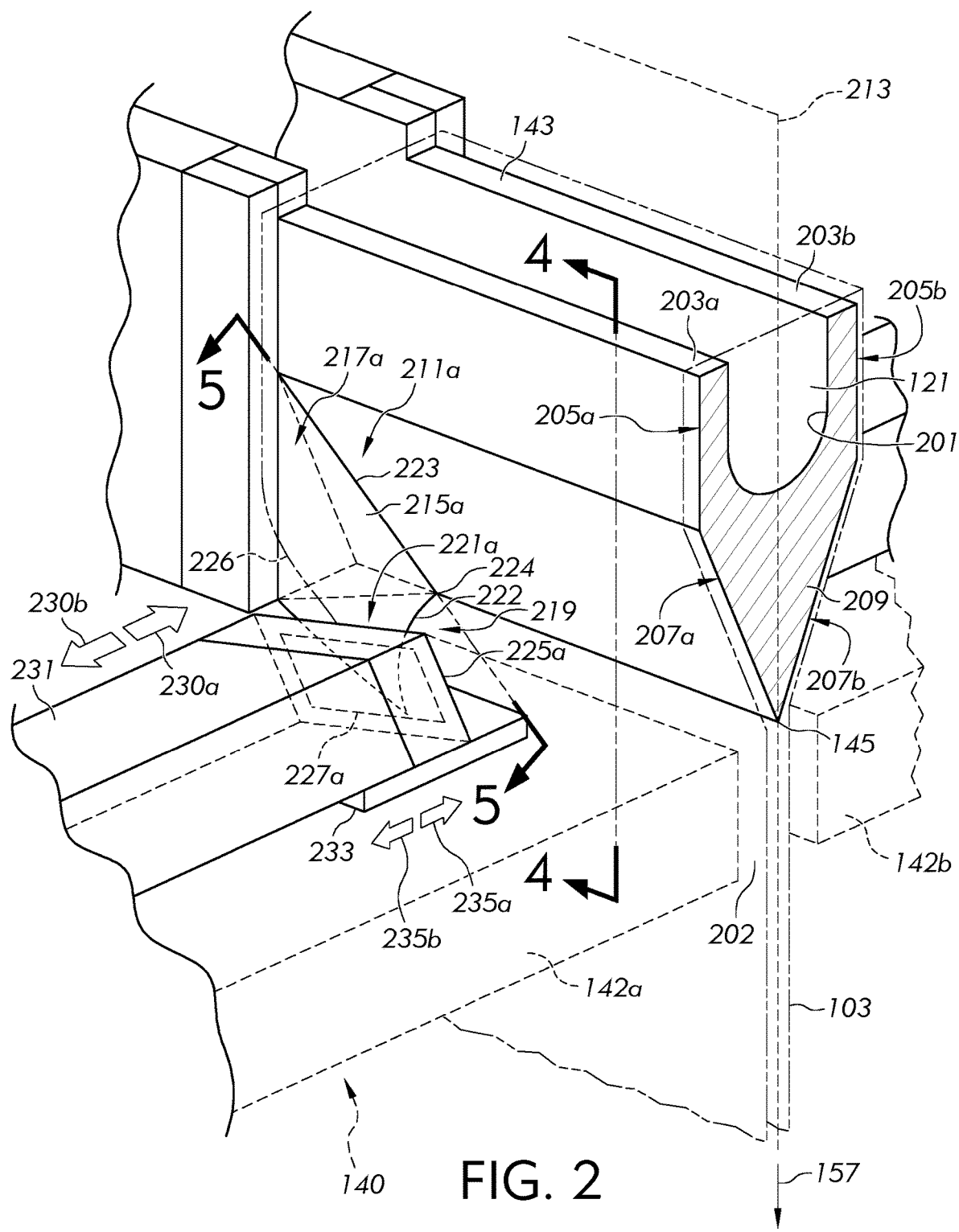
FIG. 2 illustrates a cross-sectional view of the fusion down-draw apparatus along line 2-2 of FIG. 1.

FIG. 2 is a cross-sectional perspective view of fusion down-draw apparatus 101 along line 2-2 of FIG. 1. As shown, the forming vessel 143 can include a trough 201 oriented to receive the molten material 121 from the inlet 141. The forming vessel 143 can further include a forming wedge 209 including a pair of downwardly inclined converging surface portions 207a, 207b extending between opposed ends of the forming wedge 209. The pair of downwardly inclined converging surface portions 207a, 207b converge along the draw direction 157 to form the root 145. A draw plane 213 extends through the root 145 wherein the glass ribbon 103 may be drawn in the draw direction 157 along the draw plane 213. As shown, the draw plane 213 can bisect the root 145 although the draw plane 213 may extend at other orientations relative to the root 145.

Referring to FIG. 1, a first end 210a of the forming wedge 209 can be provided with a first edge director 211a. Likewise, the second end 210b of the forming wedge 209 can include a second edge director 211b that, in some embodiments, can be a mirror image of the first edge director 211a. The first edge director 211a will be described with reference to FIGS. 2 and 4 with the understanding that such description can similarly or identically apply to the second edge director 211b as well. Indeed, in some embodiments, the second edge director 211b can be identical to the first edge director 211a.

Figure 4:
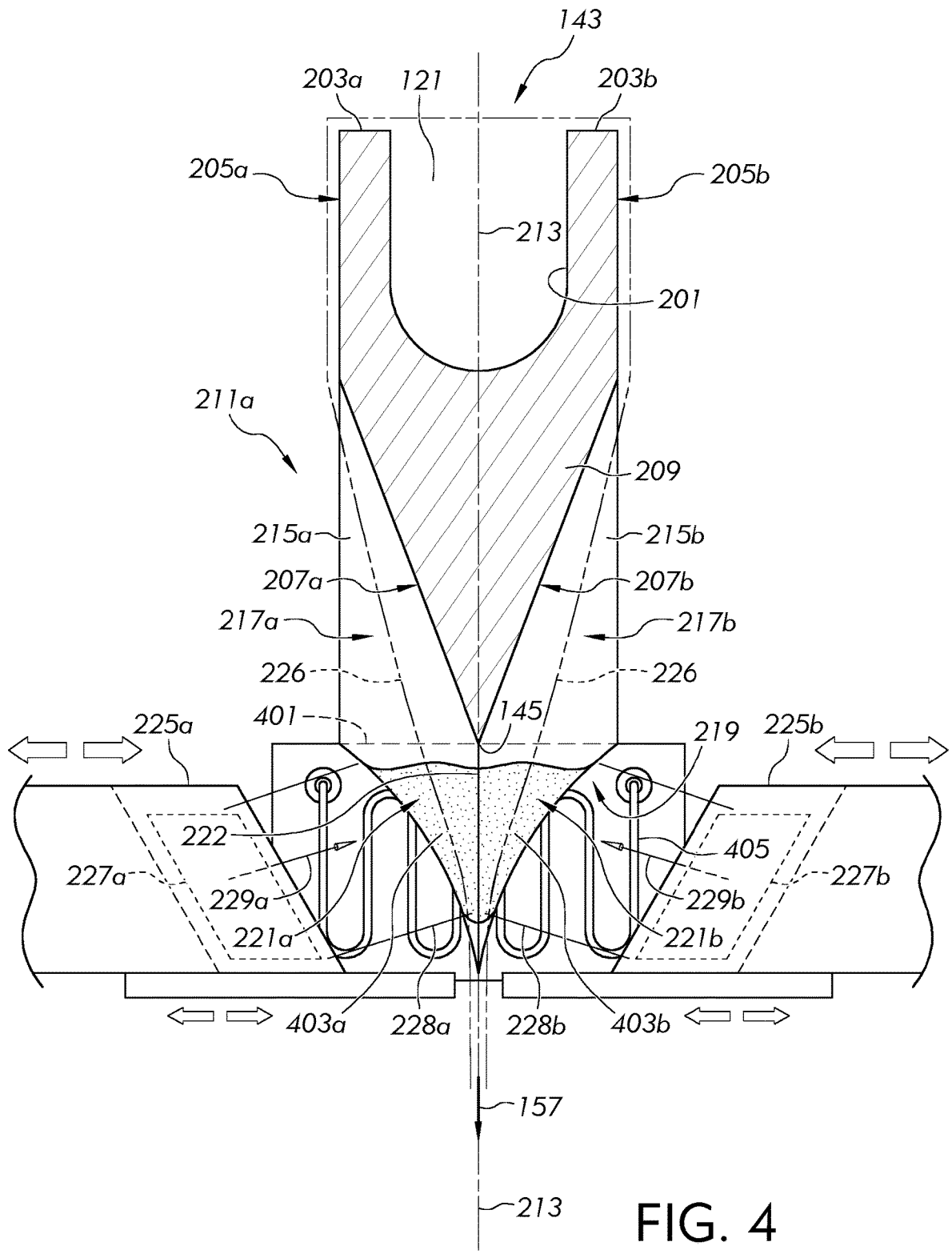
FIG. 4 illustrates a cross-sectional view of the fusion down-draw apparatus along line 4-4 of FIG. 2.
Figure 5:
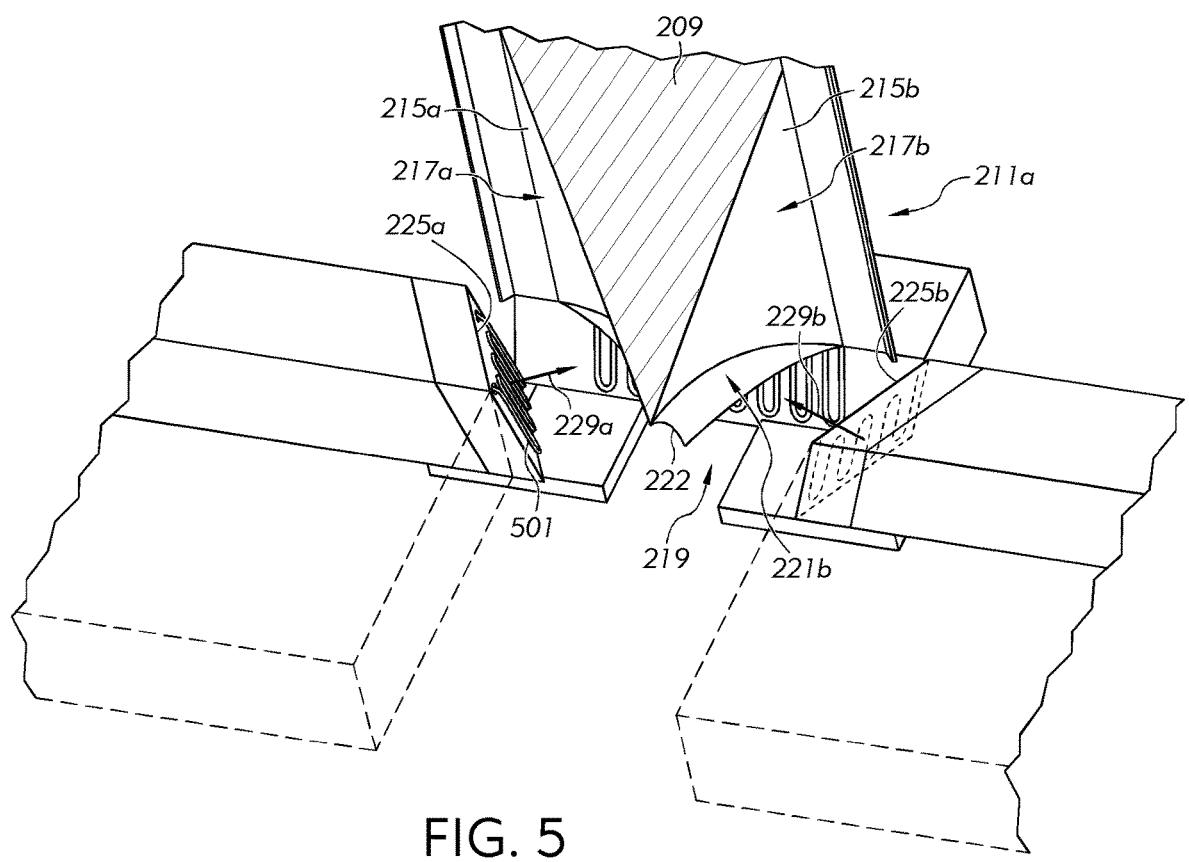
FIG. 5 is a perspective view of a cross-sectional view of the fusion down-draw apparatus along line 5-5 of FIG. 2.

The first and second edge director 211a, 211b can each intersect with at least one of the pair of downwardly inclined surface portions 207a, 207b. For instance, as shown in FIGS. 2 and 4, the first edge director 211a can include a first upper portion 215a with a first outwardly facing contact surface 217a. As shown in FIG. 4, the first edge director 211a can further include a second upper portion 215b with a second outwardly facing contact surface 217b. The first outwardly facing contact surface 217a can intersect a first inclined converging surface portion 207a of the pair of downwardly inclined surface portions. Likewise, the second outwardly facing contact surface 217b can intersect a second inclined converging surface portion 207b of the pair of downwardly inclined surface portions. In the illustrated embodiment, the first and second outwardly facing contact surfaces 217a, 217b can be identical to one another although different configurations may be provided in further embodiments. As further illustrated, each of the outwardly facing contact surfaces 217a, 217b can extend along a corresponding flat plane although the surfaces may comprise a curved surface (e.g. outwardly facing concave surface) in further embodiments.

In some embodiments, the first edge director 211a can further include a lower portion 219 that can be considered the portion of the first edge director 211a that can be positioned below a plane 401 (see FIG. 4) that can be perpendicular to the draw plane 213 (e.g., in a direction of gravity) and intersecting a point 224 (see FIG. 2) where an inner periphery 223 of the first edge director 211a intersects the root 145 of the forming wedge 209. The lower portion 219 can include a first outwardly facing contact surface 221a extending downwardly in the draw direction 157 from the first outwardly facing contact surface 217a of the first upper portion 215a to an inner edge 222. Likewise, as shown in FIG. 4, the lower portion 219 can also include a second outwardly facing contact surface 221b extending downwardly in the draw direction 157 from the second outwardly facing contact surface 217b of the first upper portion 215b to the inner edge 222. As shown, the inner edge 222 can be positioned in the draw plane 213. As further shown, the first and second outwardly facing contact surfaces 221a, 221b can be identical to one another although different configurations may be provided in further embodiments. As further illustrated, each of the outwardly facing contact surfaces 221a, 221b can extend along an outwardly facing concave surface although the outwardly facing contact surfaces 221a, 221b may include flat or other surface shapes in further embodiments. As shown, the outwardly facing contact surfaces 221a, 221b can converge towards one another to the inner edge 222 disposed under the root 145 and in the draw plane 213.

The forming vessel 143 can be formed from a wide range of materials. In some embodiments, the forming vessel 143 can comprise a refractory material such as a refractory ceramic material. The first and second edge directors 211a, 211b can also be formed from a refractory material, such as a platinum or platinum alloy.

In some embodiments, the molten material 121 can flow from the inlet 141 into the trough 201 of the forming vessel 143. The molten material 121 can then overflow from the trough 201 by simultaneously flowing over corresponding weirs 203a, 203b and downward over the outer surfaces 205a, 205b of the corresponding weirs 203a, 203b. Respective streams of molten material 121 then flow along the downwardly inclined converging surface portions 207a, 207b of the forming wedge 209 to be drawn off the root 145 of the forming vessel 143, where the flows converge and fuse into the glass ribbon 103. The glass ribbon 103 may then be fusion drawn off the root 145 in the draw plane 213 along draw direction 157. The first and second edge directors 211a, 211b can act to increase the surface area that the molten streams contact as the molten streams, corresponding to the first outer edge 153 and the second outer edge 155, converge along the downwardly inclined converging surface portions 207a, 207b. Edges 226 of the streams of molten material corresponding to the outer edges 153, 155 spread out over, and contact, the first and second outwardly facing contact surfaces 217a, 217b of each edge director 211a, 211b, thereby increasing the effective width of the molten material streams. The molten material streams then converge together as they travel along, and contact, the first and second outwardly facing contact surfaces 221a, 221b of each edge director 211a, 211b until the converging streams fuse together at the inner edge 222 of the lower portion 219 of the edge directors 211a, 211b to form the respective fused edges 153, 155 of the glass ribbon 103. Due to the increased surface area provided by the outwardly facing contact surfaces 217a, 217b of each edge director 211a, 211b, the corresponding width "W" of the glass ribbon 103 being drawn off can be increased, thereby countering attenuation of the width of the glass ribbon 103 that may occur due to surface tension of the molten material being drawn off the root 145 of the forming vessel 143.

In some embodiments, at least a portion or the entire forming vessel 143 may be housed within a housing 140 (shown schematically in dashed lines in FIG. 1) designed to help maintain desired atmospheric conditions. For instance, in some embodiments, the housing 140 may be designed to help maintain the temperature of the atmosphere with in a desired temperature range. In some embodiments, as shown schematically in hidden lines in FIG. 2, the housing 140 may have opposed lower doors 142a, 142b defining an opening 202 below the root 145 for the glass ribbon 103 to be drawn through. The width of the opening 202 can be small enough to reduce heat loss through the opening but also large enough to prevent interference with the glass ribbon 103 being drawn through the opening 202.

Features of the disclosure therefore include the forming wedge 209 including the pair of downwardly inclined surface portions 207a, 207b that converge in a downstream direction (e.g., the draw direction 157) to form the root 145 of the forming wedge 209. The first edge director 211a and the second edge director 211a each intersect with at least one of the pair of downwardly inclined surface portions 207a, 207b. Indeed, as shown, the first outwardly facing contact surface 217a of the first upper portion 215a intersects with the first downwardly inclined surface portion 207a and the second outwardly contact surface 217b of the second upper portion 215b intersects the second downwardly inclined surface portion 207b.

Embodiments of the disclosure can include a heating plane including a heat footprint facing the surface of the edge director. As shown in FIG. 4, a pair of heating planes may optionally be provided for one or both edge director 211a, 211b. For instance, the first edge director 211a can be provided with a first heating plane 225a and a second heating plane 225b with the understanding that the second edge director 211b may likewise be provided with a similar or identical first and second heating plane in some embodiments. While each edge director may be provided with a single heating plane, providing first and second heating planes, as shown, can allow heating of the outer contact surfaces that face away from one another and contact a corresponding portion of the converging streams of molten material upstream, such as immediately upstream of where the edges of the streams fuse together as they are drawn off of the inner edge 222 of the edge director.

As shown, in some embodiments, the second heating plane 225b may be a mirror image of the first heating plane 225a about the draw plane 213. For instance, in some embodiments, the second heating plane 225b can be an identical mirror image of the first heating plane 225a although different configurations may be provided in further embodiments. As such, a description of the first heating plane 225a and associated heat footprint 227a associated with the first outwardly facing contact surface 221a of the first edge director 211a will be described with the understanding that such description of the features and orientation may similarly or equally apply to the second heating plane 225b and associated heat footprint 227b associated with the second outwardly facing contact surface 221b of the first edge director 211a. Furthermore, in some embodiments, a first heating plane (not shown) and/or a second heating plane (not shown) associated with the second edge director 211b may be a mirror image of the first and second heating planes 225a, 225b associated with the first edge director 211a.

As shown in FIG. 4, in some embodiments, the first heat footprint 227a of the first heating plane 225a may face at least the first outwardly facing contact surface 221a of the lower portion 219 of the first edge director 211a. A projection 228a of the first heat footprint 227a in a first resultant direction 229a of the first heating plane 225a within the first heat footprint 227a can intersect the first outwardly facing contact surface 221a of the first edge director 211a as shown by shaded contact area 403a.

As further illustrated in FIG. 4, the second heat footprint 227b of the second heating plane 225b may face at least the second outwardly facing contact surface 221b of the lower portion 219 of the first edge director 211a. A projection 228b of the second heat footprint 227b in a second resultant direction 229b of the second heating plane 225b within the second heat footprint 227b can intersect the second outwardly facing contact surface 221b of the first edge director 211a as shown by shaded contact area 403b.

Figure 3:
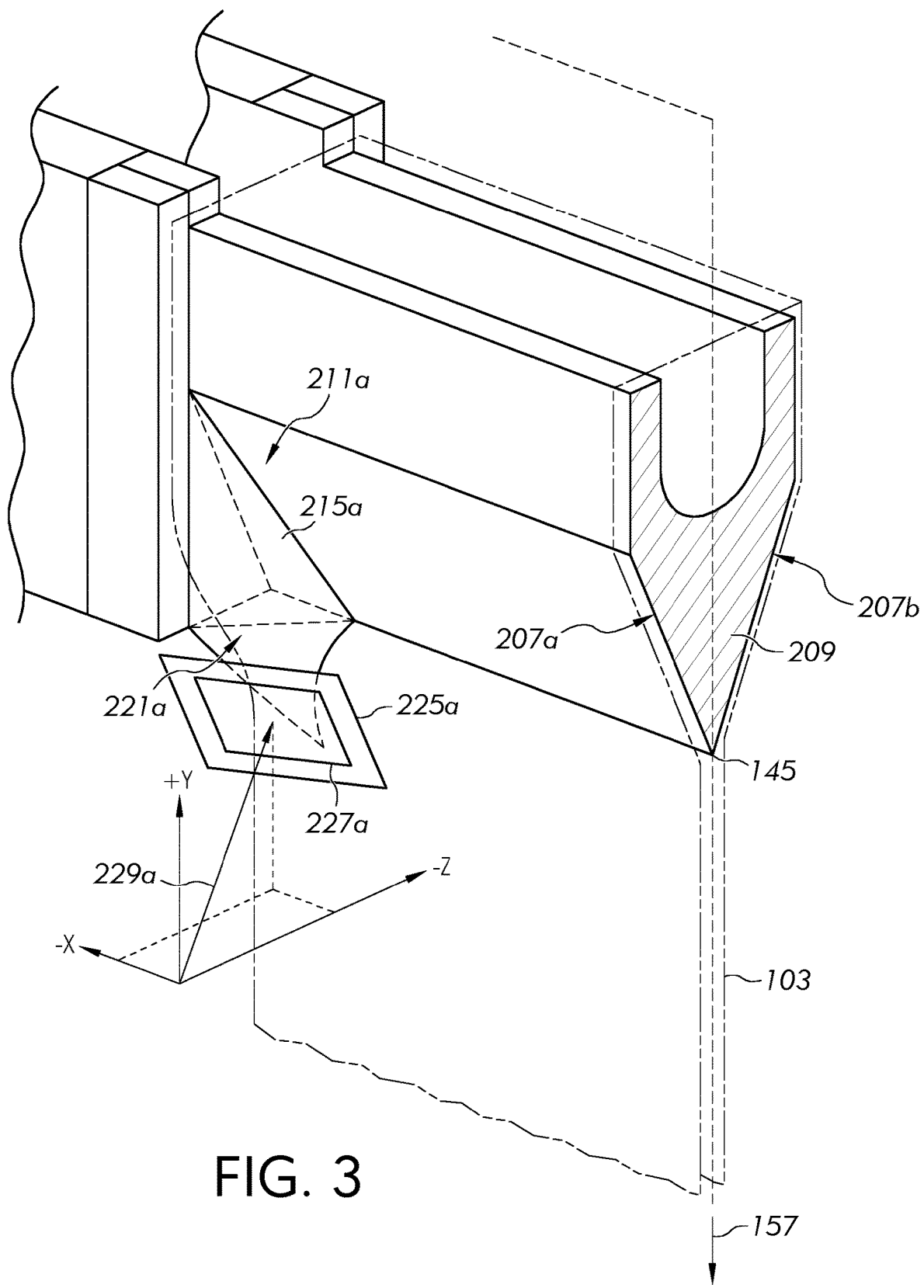
FIG. 3 is a simplified view of FIG. 2 illustrating a resultant direction of a heating plane within a heat footprint.
Figure 8:
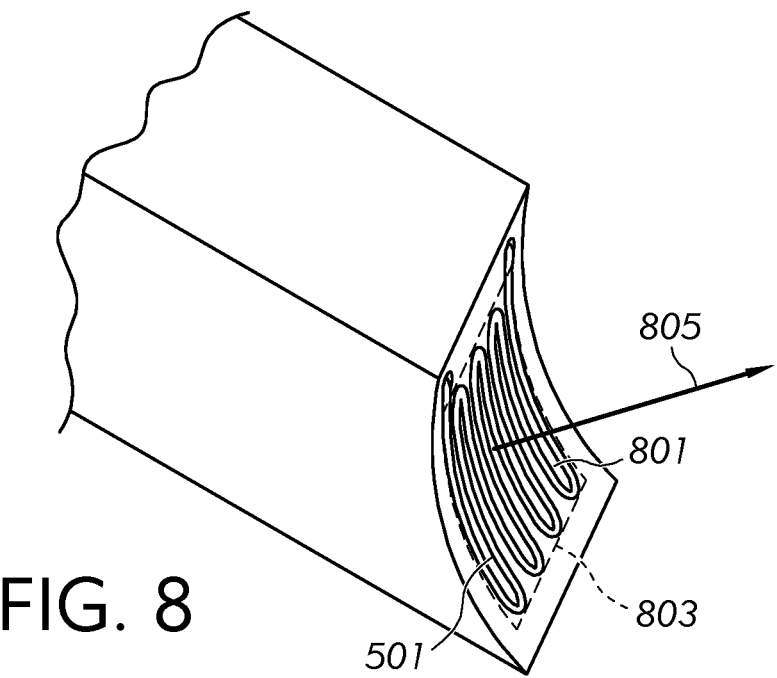
FIG. 8 is a perspective view of another embodiment of a heating plane.
Figure 9:
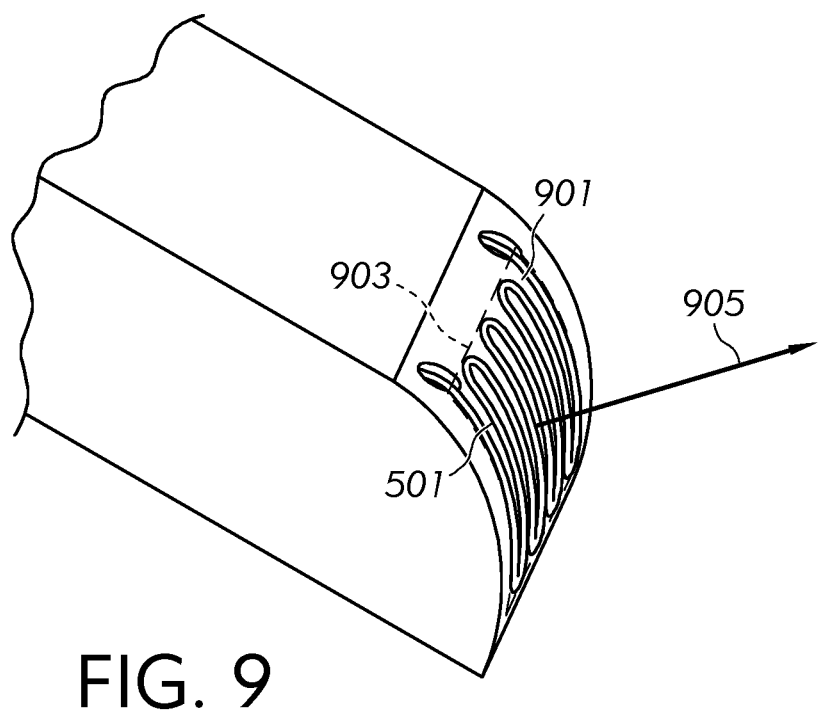
FIG. 9 is a perspective view of still another embodiment of a heating plane.

The first resultant direction 229a associated with the first heating plane 225a will be described with reference to FIG. 3 with the understanding that other resultant directions of the disclosure may have similar or identical features to the first resultant direction 229a. The resultant direction is considered the effective direction of all the directions normal (i.e., perpendicular) to the surface of the heating plane within the heat footprint. For instance, the first heating plane 225a within the heat footprint 227a of FIG. 3 is shown as a flat planar surface. Consequently, the resultant direction is the direction perpendicular to the flat planar surface. However, the heating plane within the heat footprint need not be planar in some embodiments. For instance, referring to FIG. 8, the heating plane 801 within the heat footprint 803 comprises a concave surface. In such embodiments, the resultant direction 805 can be considered the sum of all the normal directional vectors (i.e., normal at a line or plane of tangency) at each point on the heating plane 801 within the heat footprint 803. Likewise, referring to FIG. 9, the heating plane 901 within the heat footprint 903 may comprise a convex surface. In such embodiments, the resultant direction 905 can be considered the sum of all the normal directional vectors (i.e., normal at a line or plane of tangency) at each point on the heating plane 901 within the heat footprint 903.

Figure 6:
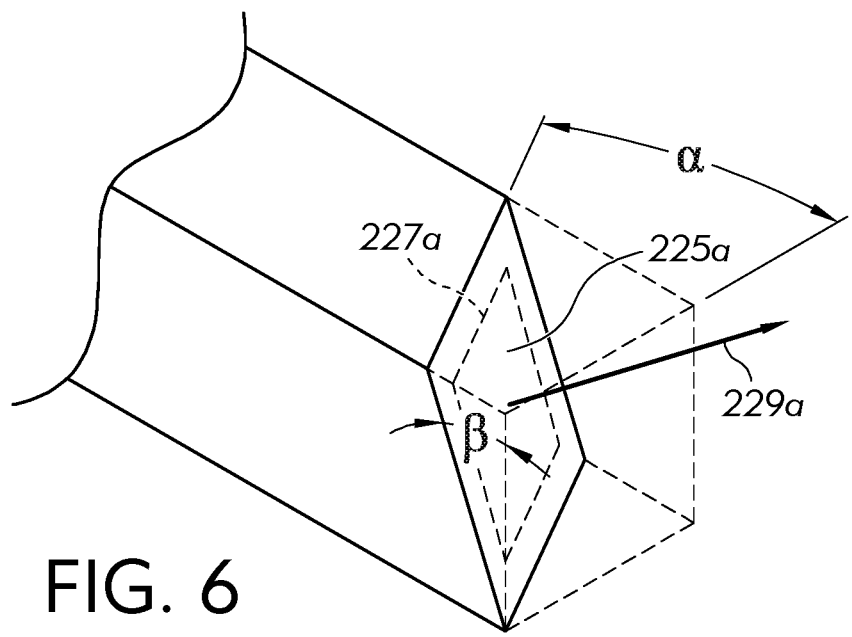
FIG. 6 is a perspective view of the heating plane.
Figure 7:
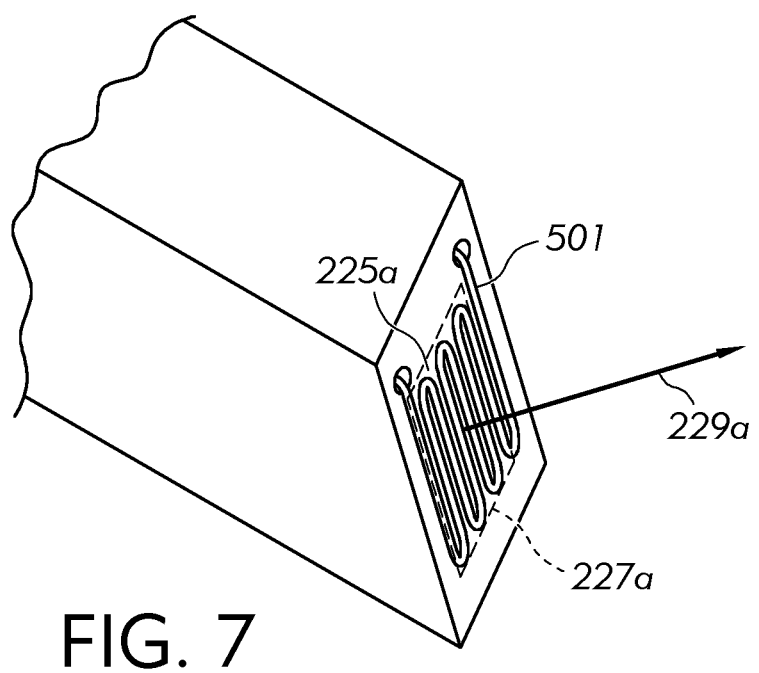
FIG. 7 is a perspective view of the heating plane of FIG. 6 with a heating element.

Providing the heating plane 225a, 225b, 801, 901 with different shapes can help the heating plane more closely face the contact surfaces of the edge directors 211a, 211b to be heated. In some embodiments, the distance between all portions of the heating plane within the heat footprint can be positioned approximately the same distance, or within a distance range, from the corresponding contact surface of the edge director. As such, all portions of the heat footprint can effectively face the corresponding portions of the contact surface in the resultant direction to minimize the distance and thereby maximize radiative heat transfer between from the heating plane to the contact surface of the edge directors. Indeed, as shown in FIG. 6, the heating plane 225a can comprise a flat surface oriented at angles α, β corresponding to a directional vector of the first resultant direction 229a (see FIG. 3) having a negative X component, a negative Z component and a positive Y component. Such heating plane 225a faces the first outwardly facing contact surface 221a with a resultant direction opposite the first resultant direction 229a (i.e, having a positive X component, a positive Z component and a negative Y component. The heating plane 801 with concave surface shown in FIG. 8 may be used, for instance, with an edge director having a convex contact surface. In further embodiments, the heating plane 901 with the convex surface shown in FIG. 9 may be used, for instance, with an edge director having a concave contact surface.

As shown in FIGS. 5 and 7-9, the heating plane may be provided with a heating element 501 such as the illustrated heating coil designed to provide radiative heat. As shown, the heating coil can be positioned on the heating plane with an outer periphery of the heating coil defining the heat footprint. Radiative heat projecting in the resultant direction from the heating element 501 may intersect the facing contact surfaces of the edge directors. In other embodiments, the heating plane may comprise a heating plate or other heating element with the outer periphery of the heating plate or heating element defining the heat footprint of the heating plane. For instance, a heating plate may be heated on a hidden side by a torch with heat conducting through the plate and radiating from the facing surface of the plate to intersect the contact surfaces of the edge directors. Such a configuration can avoid exposing the molten material to a heated gas stream that may interrupt to the flow of molten material over the contact surfaces.

In some embodiments, one or all the projections of the heat footprint in the resultant direction can intersect the surface of the edge director at least partially below the root of the forming wedge. In some embodiments, greater than 50% of the intersected surface of the edge director can be below the root. In still further embodiments, 100% of the intersected surface of the edge director can be below the root. For instance, as shown in FIG. 4, the projections 228a, 228b of each corresponding heat footprint 227a, 227b in the corresponding resultant direction 229a, 229b intersects the corresponding first and second outwardly facing contact surfaces 221a, 221b 100% below the root 145 of the forming wedge 209. Indeed, as shown in FIG. 4, the shaded contact areas 403a, 403b where the heat footprint 227a, 227b intersect the corresponding contact surfaces 221a, 221b, 100% of the contact areas are below the plane 401 that intersects the root 145. In some embodiments, the contact areas may be above the root, such as entirely above the root, where the contact areas only contact the first and second outwardly facing contact surfaces 217a, 217b above the plane 401 intersecting the root 145. However, providing greater than 50% or even 100% of the contact areas 403a, 403b below the root 145 can allow heating of the edge directors 211a, 211b to be concentrated at the lower portion 219 of the edge directors 211a, 211b, thereby heating the portions of the edge directors 211a, 211b that are prone to complications resulting from devitrification of molten material on the surfaces of the edge directors 211a, 211b. Furthermore, focusing the heating of the edge directors 211a, 211b to be concentrated on the contact surfaces 221a, 221b of the lower portion 219 of the edge directors 211a, 211b can avoid overheating of the edges of the molten material being drawn into the glass ribbon 103, thereby avoiding unwanted attenuation of the width "W" of the glass ribbon 103.

In further embodiments, heat may be applied to other portions of the edge director 211a, 211b to facilitate heating of the edge director, thereby helping prevent complication from devitrification of molten material by maintaining the temperature of the molten material above the liquidus temperature. For instance, as shown in FIG. 4, a heating coil 405 may be positioned behind the lower portion 219 of the edge directors 211a, 211b to heat the lower portion 219 from behind the lower portion. In further embodiments, although not shown, a heater may be positioned inside of the lower portion 219 of the edge directors 211a, 211b to heat the lower portion 219. However, positioning the heating plane to face the contact surfaces of the edge director can more effectively heat the lower portion 219 without overheating the molten material outside the edge directors forming the glass ribbon 103. Consequently, attenuation of the width "W" of the glass ribbon 103 can be reduced since the radiative heat from the heating plane facing the contact surfaces can be applied directly to the contact surfaces, thereby avoiding overheating other areas of the glass ribbon or molten material forming the glass ribbon. Moreover, the illustrated heating plane 227a, 227b is not positioned inside the lower portion 219. Thus, replacement of a defective heating plane 227a, 227b positioned outside of the lower portion 219 can be simplified compared to replacing a heating element disposed within the lower portion 219.

As shown in FIG. 2, in some embodiments, the heating plane 225a can be movable in an adjustment direction towards (see arrow 230a) or away (see arrow 230b) the contact surface of the edge director. As shown, the adjustment directions 230a, 230b can be perpendicular to the draw plane 213 of the forming wedge 209. Adjustment of the heating plane 225a can adjust the distance between the heating plane and the corresponding contact surface of the edge director, thereby tuning the radiative heat transfer from the heating plane 225a to the contact surface of the edge director 211a. Furthermore, in some embodiments, a support arm 231 can support the heating plane 225a and can be disposed at a lateral edge of a lower door 142a of housing 140. As such, the support arm 231 may likewise move in the adjustment directions 230a, 230b relative to the lower door 142a of the housing 140 to adjust the position of the heating plane 225a.

As still further illustrated in FIG. 2, the apparatus may optionally include an insulation shield 233 positioned below a lower perimeter of the heat footprint 227a. The insulation shield 233 can be designed to reduce heat loss from within the housing 140. As shown, the insulation shield may be movable toward (see arrow 235a) or away (see arrow 235b) the draw plane 213 relative to the heat footprint 227a. As shown, in some embodiments, the insulation shield may be movable in directions 235a, 235b perpendicular to the draw plane 213.

Methods of fusion drawing glass ribbon 103 can include flowing molten material 121 over the pair of downwardly inclined surface portions 207a, 207b of the forming wedge 209 that converge along the downstream direction 157 to form the root 145 of the forming wedge 209. The method can further include flowing the molten material 121 over a surface of the edge directors 211a, 211b such as the first and second outwardly facing contact surfaces 217a, 217b of the respective first and second upper portions 215a, 215b and the first and second outwardly facing contact surfaces 221a, 221b of the lower portion 219.

The method can further include drawing the molten material 121 from the root 145 of the forming wedge 209 along the draw plane 213 in the downstream direction 157 to form the glass ribbon 103 while edges 226 of the streams of molten material flow off the inner edge 222 of the edge directors 211a, 211b to fuse together to form the edges 153, 155 of the glass ribbon 103. Still further, the method can include radiating heat within the heat footprint 227a, 227b of the heating plane 225a, 225b toward the surface (e.g., contact surfaces 217a, 217b, 221a, 221b) of the edge director 211a, 211b. At least a portion of the heating plane 225a, 225b within the heat footprint 227a, 227b faces the surface of the edge director 211a, 211b. In some embodiments, the heating plane includes a flat surface such as the heating plane 225a shown in FIGS. 2-7. In further embodiments, the heating plane can include a concave surface such as the heating plane 801 shown in FIG. 8. In still further embodiments, the heating plane can include a convex surface such as the heating plane 901 shown in FIG. 9. In some embodiments, the heating plane can be selected with a flat surface, concave surface, convex surface or other surface shape to approximate a surface topography of a portion of the contact surface of the edge directors 211a, 211b that the heating plane faces.

The method can further include intersecting the surface of the edge director (e.g., see shaded contact areas 403a, 403b in FIG. 4) with the heat radiating from the heat footprint 227a, 227b of the heating plane 225a, 225b. In some embodiments, the projection 228a, 228b of the heat footprint 227a, 227b in the resultant direction 229a, 229b of the heating plane 225a, 225b within the heat footprint 227a, 227b intersects the surface of the edge director at least partially below the root 145. In some embodiments, greater than greater than 50% of the of the intersected surface of the edge director 211a, 211b may be below the root 145. In further embodiments, 100% of the intersected surface of the edge director 211a, 211b may be below the root 145. Indeed, as shown, the shaded contact areas 403a, 403b are located on the contact surfaces 221a, 221b of the lower portion 219 entirely below the root 145.

In some embodiments, the method can include moving the heating plane 225a, 225b in one of the adjustment directions 230a, 230b (e.g., perpendicular to the draw plane 213) towards the surface of the edge director 211a, 211b. Such adjustment of the heating plane can help tune in the desired radiative heat transfer rate from the heating plane to the contact surface of the edge director.

In some embodiments, the method can include positioning the insulation shield 233 below a lower perimeter of the heat footprint 227a, 227b to inhibit heat loss below the lower perimeter of the heat footprint. In some embodiments, the insulation shield 233 can be moved relative to the heat footprint in adjustment directions 235a, 235b toward or away from the draw plane 213 (e.g., in a direction perpendicular to the draw plane). Adjusting the insulation shield 233 can help control heat loss from the housing 140 while providing sufficient clearance for the glass ribbon 130 being drawn from the forming wedge 209 and edge directors 211a, 211b.

It should be understood that while various embodiments have been described in detail with respect to certain illustrative and specific embodiments thereof, the present disclosure should not be considered limited to such, as numerous modifications and combinations of the disclosed features are possible without departing from the scope of the following claims.

What is claimed is:

1. A fusion draw method of making a glass ribbon comprising:
   flowing molten material over a pair of downwardly inclined surface portions of a wedge, the downwardly inclined surface portions converging along a downstream direction to form a root of the wedge;
   flowing the molten material over a surface of an edge director, the edge director intersecting with at least one of the pair of downwardly inclined surface portions;
   drawing the molten material from the root of the wedge along a draw plane in the downstream direction to form the glass ribbon, the draw plane extending through the root and bisecting the root;
   radiating heat from a heat footprint of a heating plane toward the surface of the edge director, the heating plane within the heat footprint facing the surface of the edge director so that the surface of the edge director is intersected with the heat radiating from the heat footprint of the heating plane, the heat footprint and the heating plane located on a first side of the draw plane and not intersected by the draw plane, wherein a projection of the heat footprint in a resultant direction of the heating plane within the heat footprint intersects the surface of the edge director, and wherein greater than 50% of the surface of the edge director intersected by the projection of the heat footprint is below the root; and positioning an insulation shield below a lower perimeter of the heat footprint and below the projection of the heat footprint in the downstream direction to inhibit heat loss below the lower perimeter of the heat footprint.

2. The method of claim 1, wherein the heating plane facing the edge director comprises a non-planar surface.

3. The method of claim 1, wherein 100% of the surface of the edge director intersected by the projection of the heat footprint is below the root.

4. The method of claim 1, wherein the heating plane faces the edge director and includes a flat surface.

5. The method of claim 1, wherein the heating plane faces the edge director and includes one of a convex surface or a concave surface.

6. The method of claim 1, wherein all portions of the heat footprint can face corresponding portions of the surface of the edge director such that a distance between all portions of the heating plane within the heat footprint are substantially the same distance from the corresponding portions of the surface of the edge director.

7. The method of claim 1, further including moving the heating plane in an adjustment direction towards the surface of the edge director, and wherein the adjustment direction is along a linear axis that is perpendicular to the draw plane and intersects the molten material.

8. The method of claim 1, wherein a projection of the heat footprint in a resultant direction of the heating plane within the heat footprint intersects and is perpendicular to the draw plane.

9. The method of claim 1, further including providing lower doors spaced apart on opposite sides of the glass ribbon to define an opening below the root such that the glass ribbon extends through the opening, wherein the insulation shield is positioned between one of the lower doors and the heating plane.

10. The method of claim 9, further including moving the insulation shield and the lower doors toward the draw plane such that the insulation shield and the lower doors are movable in a direction perpendicular to the draw plane.

11. The method of claim 1, further comprising radiating heat from a second heating plane that is a mirror image of the heating plane about the draw plane with the second heating plane located on a second side, opposite the first side, of the draw plane.

* * * * *